Feb. 23, 1932. W. J. TAYLOR 1,846,042
PNEUMATIC TIRE CASING
Filed Nov. 9, 1927 2 Sheets-Sheet 1
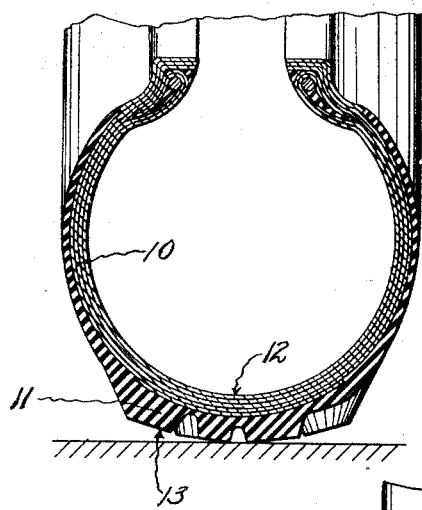
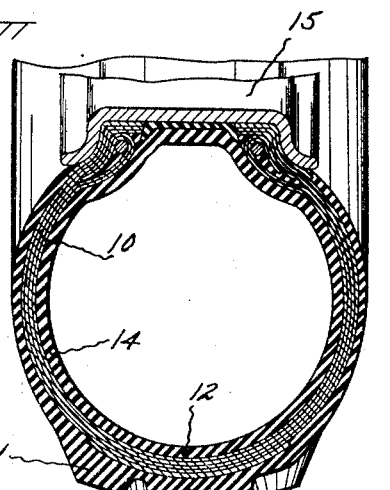
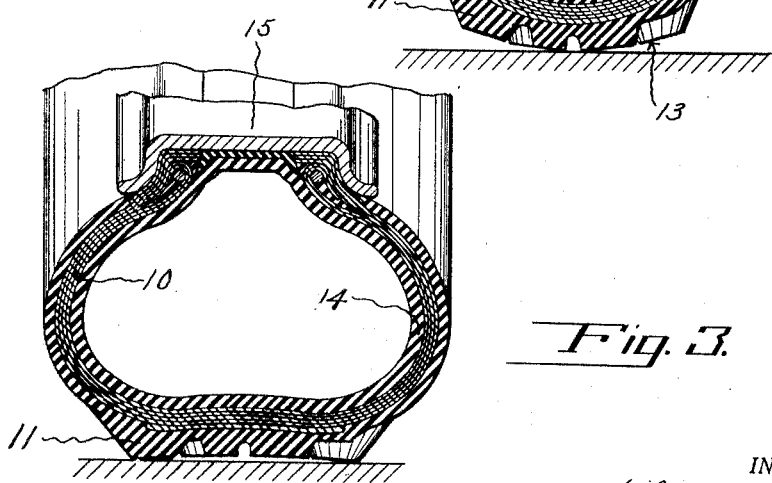

Feb. 23, 1932.   W. J. TAYLOR   1,846,042
PNEUMATIC TIRE CASING
Filed Nov. 9, 1927   2 Sheets-Sheet 2

INVENTOR.
BY William J. Taylor
Edward C. Taylor
ATTORNEY.

Patented Feb. 23, 1932

1,846,042

UNITED STATES PATENT OFFICE

WILLIAM J. TAYLOR, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

PNEUMATIC TIRE CASING

Application filed November 9, 1927. Serial No. 232,023.

My invention relates to pneumatic tire casings. It has for one object the equalization and improvement of the wear of the tread portion of the tire. It has for a further object the improvement of the riding qualities of tires, both in increased resiliency and better stability. It has for a further object the improvement in the tractive and non-skid qualities of a tire.

Referring to the drawings,

Fig. 1 is a partial section view of a pneumatic tire casing of the usual type uninflated and with no load exerted upon it;

Fig. 2 is a view of the same tire inflated but unloaded;

Fig. 3 is a view of the same tire both inflated and loaded;

Figure 4:
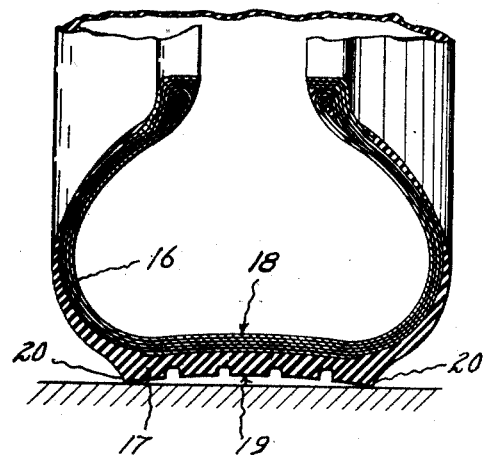
Fig. 4 is a view of my improved tire uninflated and under no load.

Tire casings are universally built with a carcass portion 10 surmounted by a tread portion 11, the former being built of material such as a rubberized cord fabric to withstand inflation and driving strain, and the latter composed of wear-resisting rubber suitably shaped to offer resistance to slipping when on the road. It is customary to build these tires with the carcass formed on a curve 12 and the tread on a curve 13, which, as shown by a comparison of Figs. 1 and 2, are similar when the tire is uninflated and inflated but unloaded. When such a tire is subjected to load it flattens out, but the pressure of the load on the edges of the tread is much greater than the pressure at the center, and the center of the tread pushes up as shown in Fig. 3. I have shown this standard tire as being supplied with a tube 14 and mounted on a rim 15.

Figure 5:
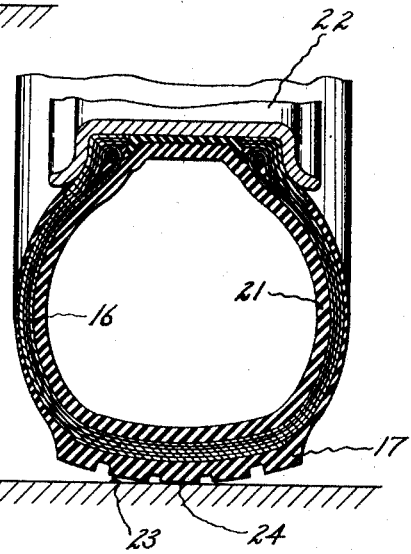
Fig. 5 is a similar view with the tire inflated but under no load.

I form my improved tire with a carcass 16 and a tread 17 of generally standard construction. Instead of building the tire on a curvature to which it is normally inflated, however, I provide both the carcass and the tread with re-entrant curvatures 18 and 19, respectively, sufficient so that when the tire is uninflated and unloaded, as shown in Fig. 4, contact with the road surface will be made only at the corners 20. The tube has been shown at 21 and the usual rim at 22. When this tire is inflated and unloaded, as shown in Fig. 5, it rounds out as at 23 so that the road contact is made only at the center 24 of the tread, taking on somewhat the shape of the usual tire. When the tire is loaded it flattens out exerting even pressure over the whole flat surface 25 of the tread.

Several desirable results follow from this novel construction. In the first place the pressure over the entire road contacting surface being uniform the tread rubber will wear uniformly. This adds greatly to the available life of the tire as the wear per unit area will not be as great as in the case of tires having uneven distribution of pressure. Furthermore, by distributing the pressure over the road contacting surface and particularly by having sufficient pressure at the tread edges the non-skid and tractive properties of the tire will be increased.

Another rather peculiar effect which aids considerably in the stability of the tire in use is that rather higher air pressure can be used in inflating the tire without detracting from the cushioning properties. To understand the reason for this it is necessary to consider again the standard tire shown in Figs. 1 to 3. When this tire is inflated the natural stiffness of the carcass resists the deflection to the position of Fig. 3 so that the tire will carry a certain amount of load in addition to that borne by air pressure within, without getting below the permissible deflation. It has been found that this normal stiffness of the carcass is equivalent to about ten pounds of air. In my improved tire the carcass in the inflated condition of Fig. 5 is held in the shape shown by the air pressure and not by any stiffness of the carcass. Indeed, the carcass has a natural tendency to return to the condition of Fig. 4. When load is applied to such a tire, therefore, it will be found that a higher degree of air pressure is necessary to keep the tire from too great deflection than was the case with the tire having a standard profile. About ten pounds higher pressure can be carried in my improved tire without decreasing its resiliency and this adds considerably to the stability of the tire, resulting in the reduction of the possibility of the common effect known as shimmying.

Figure 6:
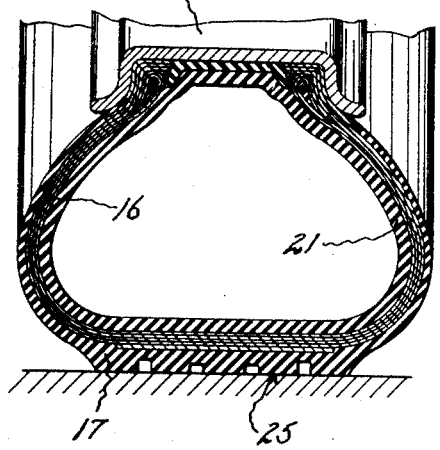
Fig. 6 is a similar view with the tire both inflated and loaded.

Besides the advantages mentioned, the tire described gives greater life in the carcass material for the reason that when the tire is under load as in Fig. 6 the carcass material is substantially in the condition in which it was built and is not held in a distorted position as was the case with the normal tire shown in Fig. 3. The carcass structure of my tire may be built up with rubberized cords placed at such angles as to hold the tire in any desired cross-sectional shape or may be built up in any of the standard manners.

Having thus described my invention, I claim:

1. A pneumatic tire casing having a molded, uninflated cross-sectional contour characterized by a reentrant curvature of the tread and the portion of the carcass underlying the tread, said curvature extending across the entire width of the tread, the flexibility of the carcass and degree of said curvature being such that upon inflation of the casing the tread and underlying carcass portion assumes an outward curvature.

2. A pneumatic tire casing having a molded cross-sectional contour characterized by a reentrant curvature of the tread and the portion of the carcass underlying the tread, the width and depth of said curvature being such that, when the tire is uninflated and unloaded, contact with the road surface will be made only at the edges of the tread, the tread and carcass of the tire being sufficiently flexible to permit the unloaded tire to round out when inflated so that road contact will be made only at the center of the tread.

WILLIAM J. TAYLOR.